United States Patent
Hakoda et al.

(10) Patent No.: US 9,866,378 B2
(45) Date of Patent: *Jan. 9, 2018

(54) ENCRYPTION METHOD, ENCRYPTOR, AND ENCRYPTION SYSTEM FOR ENCRYPTING ELECTRONIC DATA BY SPLITTING ELECTRONIC DATA

(71) Applicant: PANASONIC INTELLECTUAL PROPERTY CORPORATION OF AMERICA, Torrance, CA (US)

(72) Inventors: Kotaro Hakoda, Osaka (JP); Katsuya Kosugi, Hyogo (JP); Mitsuhiro Matsunaga, Kyoto (JP); Nobuhiro Kambe, Osaka (JP); Teruo Kamiyama, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,424

(22) Filed: Jun. 8, 2017

(65) Prior Publication Data

US 2017/0272241 A1    Sep. 21, 2017

Related U.S. Application Data

(63) Continuation of application No. 14/876,552, filed on Oct. 6, 2015, now Pat. No. 9,692,594.

(30) Foreign Application Priority Data

Oct. 27, 2014    (JP) ................. 2014-218758

(51) Int. Cl.
*H04L 29/06* (2006.01)
*H04L 9/08* (2006.01)
*G06F 21/62* (2013.01)

(52) U.S. Cl.
CPC ......... *H04L 9/085* (2013.01); *G06F 21/6245* (2013.01); *H04L 63/0428* (2013.01)

(58) Field of Classification Search
CPC ..................................... H04L 9/085
See application file for complete search history.

(56) References Cited

U.S. PATENT DOCUMENTS

| | | | |
|---|---|---|---|
| 6,868,406 B1 * | 3/2005 | Ogg ................. | G07B 17/00193 705/401 |
| 2003/0120949 A1 * | 6/2003 | Redlich ............ | C07K 14/70575 726/21 |

(Continued)

FOREIGN PATENT DOCUMENTS

| | | |
|---|---|---|
| CN | 103226802 | 7/2013 |
| JP | 2008-193612 | 8/2008 |

OTHER PUBLICATIONS

Giuseppe Ateniese et al., "Visual Cryptography for General Access Structures", Information and Computation 129, (1996), pp. 86-106.

(Continued)

*Primary Examiner* — Shawnchoy Rahman
(74) *Attorney, Agent, or Firm* — Greenblum & Bernstein, P.L.C.

(57) ABSTRACT

An encryption method includes displaying encryption target data on a display screen as an image, performing first acceptance in which designation of an at least partial region of the displayed image is accepted, performing second acceptance in which designation regarding splitting of the designated at least partial region is accepted, and splitting data that is included in the encryption target data and corresponds to the designated at least partial region in accordance with the designation regarding the splitting under a secret sharing scheme.

6 Claims, 12 Drawing Sheets

(56) References Cited

U.S. PATENT DOCUMENTS

| | | |
|---|---|---|
| 2008/0019573 A1 | 1/2008 | Baltatu et al. |
| 2008/0228808 A1 | 9/2008 | Kobara |
| 2010/0008505 A1* | 1/2010 | Bai .................. H04L 9/085 |
| | | 380/255 |
| 2010/0097338 A1* | 4/2010 | Miyashita ......... G06F 3/04883 |
| | | 345/173 |
| 2012/0166576 A1* | 6/2012 | Orsini ............... G06F 11/1471 |
| | | 709/217 |
| 2015/0116542 A1 | 4/2015 | Lee |
| 2016/0373440 A1* | 12/2016 | Mather ............. H04L 63/0861 |

OTHER PUBLICATIONS

Moni Noar and Adi Shamir, "Visual Cryptography", Workshop on the Theory and Application of Cryptographic Techniques, Springer Berlin Heidelberg, 1994.

Chih-Ching Thien and Ja-Chen Lin, "Secret image sharing", Computers & Graphics 26 (2002), pp. 765-770.

* cited by examiner

ENCRYPTION METHOD, ENCRYPTOR, AND ENCRYPTION SYSTEM FOR ENCRYPTING ELECTRONIC DATA BY SPLITTING ELECTRONIC DATA

CROSS-REFERENCE TO RELATED APPLICATION

The present application is continuation application of U.S. patent application Ser. No. 14/876,552, filed Oct. 6, 2015, which claims the benefit of Japanese Patent Application No. 2014-218758, filed on Oct. 27, 2014. The entire disclosure of each of the above-identified applications, including the specification, drawings, and claims, is incorporated herein by reference in its entirety.

TECHNICAL FIELD

The present disclosure relates to an encryption method and the like for encrypting electronic data by splitting the electronic data.

DESCRIPTION OF THE RELATED ART

The necessity of safely retaining and managing electronic information has been increasing in recent years. Particularly in cloud computing or the like, where diverse services are provided from servers via networks, leakage of information sent out on the networks, etc. may easily occur. Various techniques are suggested so as to prevent such leakage of information (see, for example, Japanese Unexamined Patent Application Publication No. 2008-193612).

A known technique to prevent information from leaking out is a secret sharing scheme (threshold secret sharing scheme), by which secret data including important information is distributed to be n pieces of distributed data and the secret data can be decoded (reconstructed) only when k, which is a threshold, or more pieces of the n pieces of distributed data are collected.

In a secret sharing scheme, generally, data is split uniformly regardless of the content of the data.

SUMMARY

One non-limiting and exemplary embodiment provides an encryption method and the like, which enable designation regarding splitting of specific part of data, which is for example, part included in the data and has high confidentiality, such as designation of the number of splits, to be performed easily.

In one general aspect, the techniques disclosed here feature an encryption method using a secret sharing scheme, the encryption method including: displaying encryption target data on a display screen as an image; performing first acceptance in which designation of an at least partial region of the displayed image is accepted; performing second acceptance in which designation regarding splitting of the designated at least partial region is accepted; and splitting data that is included in the encryption target data and corresponds to the designated at least partial region in accordance with the designation regarding the splitting under the secret sharing scheme.

According to the encryption method of the present disclosure, designation regarding splitting of specific part of data can be easily performed.

It should be noted that general or specific embodiments may be implemented as a system, a device, an integrated circuit, a computer program, a recording medium, such as a computer-readable compact disc-read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
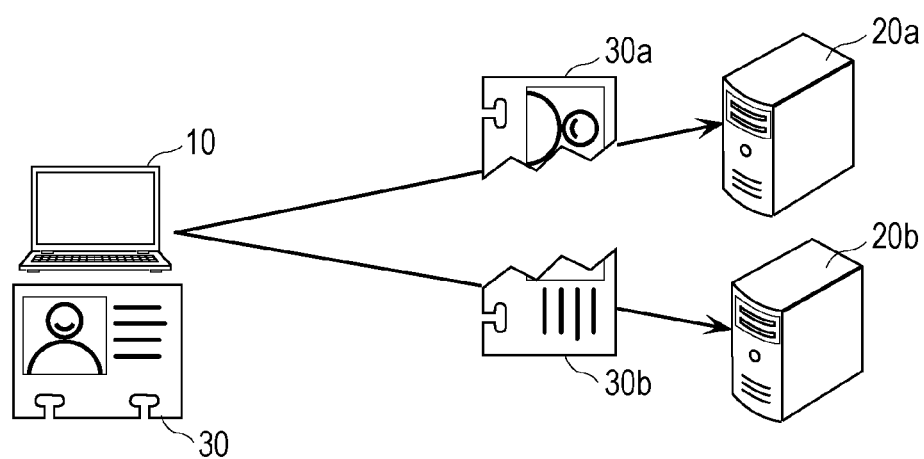
FIG. 1 is a schematic illustration for explaining an encryption method according to Embodiment 1 in outline.

An encryption method according to an aspect of the present disclosure uses a secret sharing scheme and includes: displaying encryption target data on a display screen as an image; performing first acceptance in which designation of an at least partial region of the displayed image is accepted; performing second acceptance in which designation regarding splitting of the designated at least partial region is accepted; and splitting data that is included in the encryption target data and corresponds to the designated at least partial region in accordance with the designation regarding the splitting under the secret sharing scheme.

Thus, a user can easily perform designation regarding splitting on specific part included in the encryption target data through the display screen.

In the second acceptance, at least one of the number of splits and a threshold indicating the number of pieces of the encryption target data after the splitting, which is necessary for decoding, may be accepted as the designation regarding the splitting.

Thus, a user can easily designate at least one of the number of splits and the threshold for specific part included in the encryption target data through the display screen.

In the second acceptance, the number of taps on the display screen may be accepted as the number of splits or the threshold, and in the displaying the encryption target data, the number of taps may be further displayed on the display screen.

Thus, a user can easily designate the number of splits or the threshold of specific part included in the encryption target data through the tapping operation on the display screen.

In the second acceptance, a count value obtained by counting up for a duration of a long push against the display screen may be accepted as the number of splits or the threshold, and in the displaying the encryption target data, the count value may be further displayed on the display screen.

Thus, a user can easily designate the number of splits or the threshold of specific part included in the encryption target data by the long push operation on the display screen.

In the second acceptance, a numeral provided through handwriting input onto the display screen may be accepted as the number of splits or the threshold, and in the displaying the encryption target data, the numeral may be further displayed on the display screen.

Thus, a user can easily designate the number of splits or the threshold of specific part included in the encryption target data through the handwriting input of a numeral onto the display screen.

In the second acceptance, the number of regions caused by a splitting line provided through handwriting input in the at least partial region on the display screen may be accepted as the number of splits, and in the displaying the encryption target data, the splitting line may be further displayed on the display screen.

Thus, a user can easily designate the number of splits of specific part included in the encryption target data through the handwriting input of a splitting line onto the display screen. When the splitting line is displayed on the display screen in this manner, the user can visually recognize the degree of the splitting.

In the displaying the encryption target data, a graphical user interface (GUI) of a slider may be further displayed on the display screen, and in the second acceptance, a value specified by a position of a knob of the slider may be accepted as the number of splits or the threshold.

Thus, a user can easily designate the number of splits or the threshold of specific part included in the encryption target data through the dragging operation on the knob of the slider.

In the splitting the data, data that is included in the encryption target data and corresponds to a remaining region other than the designated at least partial region may be further split by a predetermined method using a secret sharing scheme.

In the second acceptance, designation regarding splitting of a remaining region other than the designated at least partial region may be further accepted, and in the splitting the data, data that is included in the encryption target data and corresponds to the remaining region may be split in accordance with the designation regarding the splitting of the remaining region under a secret sharing scheme.

The encryption method may further include causing the split encryption target data to be stored in a plurality of server devices through distribution.

The secret sharing scheme is an encryption scheme, in which target data is split into data pieces so that the number of data pieces of the split target data is equal to or larger than a threshold, and decoding of the target data using the data pieces is impossible when the number of data pieces is smaller than the threshold.

An encryptor according to an aspect of the present disclosure uses a secret sharing scheme and includes: a display control unit that outputs information for displaying encryption target data on a display screen as an image; a first acceptance unit that accepts designation of an at least partial region of the displayed image; a second acceptance unit that accepts designation regarding splitting of the designated at least partial region; and a splitting unit that splits data included in the encryption target data and corresponding to the designated at least partial region in accordance with the designation regarding the splitting under the secret sharing scheme.

An encryption system according to an aspect of the present disclosure uses a secret sharing scheme and includes: an information communication terminal; and a server, the information communication terminal including: a reception unit that receives information for displaying encryption target data as an image from the server; a display unit that displays the image based on the information; a first acceptance unit that accepts designation of an at least partial region of the displayed image; a second acceptance unit that accepts designation regarding splitting of the designated at least partial region; and a transmission unit that transmits the designation of the at least partial region and the designation regarding the splitting to the server, the server including: a server transmission unit that transmits the information to the information communication terminal; a server reception unit that receives the designation of the at least partial region and the designation regarding the splitting from the information communication terminal; and a splitting unit that splits data included in the encryption target data and corresponding to the designated at least partial region in accordance with the designation regarding the splitting under the secret sharing scheme.

It should be noted that general or specific embodiments may be implemented as a system, a device, an integrated circuit, a computer program, a recording medium, such as a computer-readable compact disc-read-only memory (CD-ROM), or any selective combination thereof.

Embodiments are described in detail below with reference to the drawings.

All of the embodiments described below provide general or specific examples. The values, shapes, materials, constituent elements, arrangement positions of the constituent elements, connection forms, steps, order of the steps, and the like that are indicated below in the embodiments are mere examples and are not intended to limit the present disclosure. Among the constituent elements of the embodiments below, the constituent elements that are not recited in the independent claims indicating the most superordinate concepts can be explained as given constituent elements.

Each drawing is a schematic diagram, which is not necessarily illustrated precisely. In the drawings, the same references are given to substantially the same constituent elements and overlapping explanation on such constituent elements may be omitted or simplified.

[Embodiment 1]
[Outline of Encryption Method]

An encryption method (a secret sharing process) of data that an encryptor 10 according to Embodiment 1 performs is described in outline first. FIG. 1 is a schematic illustration for explaining the outline of the encryption method.

The encryptor 10 is a device that splits encryption target data 30 in accordance with the secret sharing scheme, distributes the split data to cloud servers 20a and 20b, and causes the split data to be stored in the cloud servers 20a and 20b. In the example of FIG. 1, the encryptor 10 splits the encryption target data 30 into split data 30a and split data 30b, and distributes and transmits the split data 30a and the split data 30b to the cloud servers 20a and 20b. That is, the encryption target data 30 is distributed to and stored in the cloud servers 20a and 20b.

The secret sharing scheme (threshold secret sharing scheme) is an encryption scheme, in which target data is split into data pieces so that the number of data pieces of the split target data is equal to or larger than a threshold, and decoding of the target data using the data pieces is impossible when the number of data pieces is smaller than the threshold.

Figure 2:
FIG. 2 is an illustration for explaining data splitting of an encryptor according to Embodiment 1.
Figure 3:
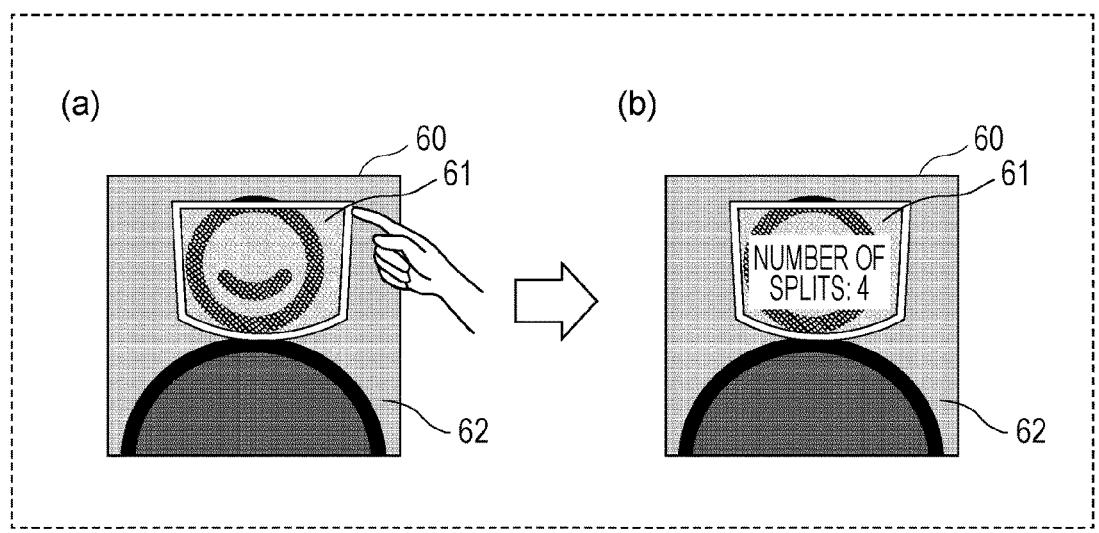
FIG. 3 is an illustration for explaining the data splitting of the encryptor according to Embodiment 1.

In the encryptor 10, the above-described splitting of data is performed in accordance with input onto an image displayed on a display screen 40. FIGS. 2 and 3 are illustrations for explaining the data splitting of the encryptor 10.

In the encryption, the encryption target data 30 is displayed on the display screen 40 of a display unit 15 of the encryptor 10 as an image 50. In Embodiment 1, the encryption target data 30, which is the image 50, is a still image including a photograph region 60 in which a face photograph is positioned.

When for example, the photograph region 60 has high confidentiality for a user, first of all, the user designates a portion that is included in the photograph region 60 and corresponds to the face as a target region 61 as illustrated in FIG. 3(a). The portion other than the target region 61 is referred to as a non-target region 62. After that, the user designates the number of splits of the target region 61 as illustrated in FIG. 3(b).

On accepting the designation of the target region 61 and the designation of the number of splits from the user, the encryptor 10 splits the encryption target data 30 corresponding to the target region 61 into pieces of the designated number of splits. Then, the encryptor 10 distributes and transmits the encryption target data 30 after the splitting to a plurality of cloud servers, which are the cloud servers 20a and 20b.

Thus, with the encryptor 10, a user can readily designate the part of the encryption target data 30, for which the user desires to designate the number of splits, and the number of splits through the display screen 40 (the display unit 15). That is, a user can easily designate the number of splits of specific part included in the encryption target data 30.

[Structure and Operations of Encryptor]

Figure 4:
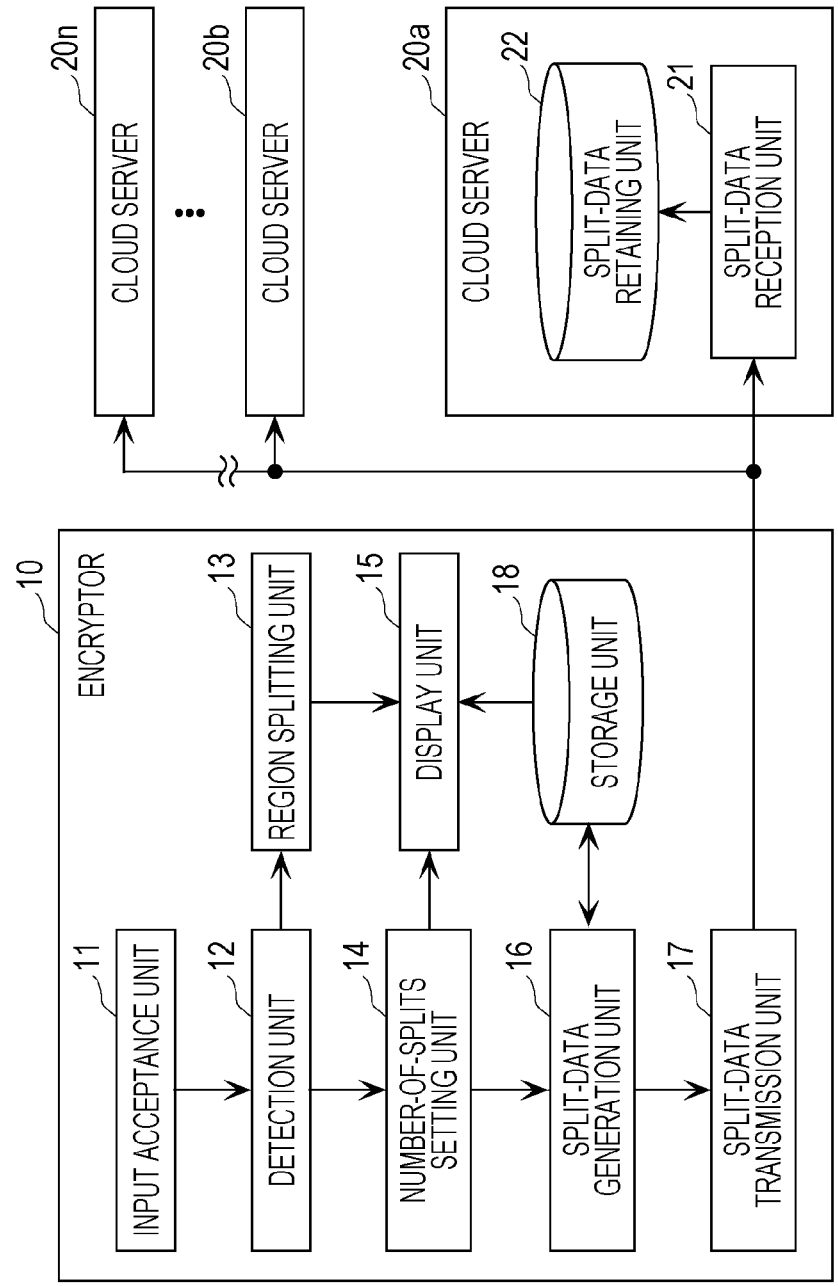
FIG. 4 is a block diagram that illustrates a functional structure of the encryptor according to Embodiment 1.
Figure 5:
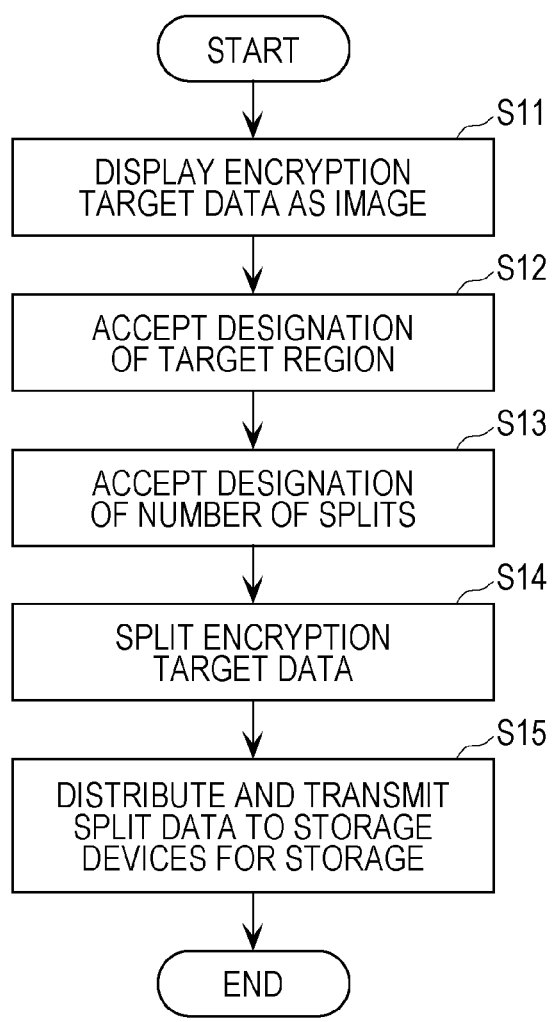
FIG. 5 is a flow chart that illustrates operations of the encryptor according to Embodiment 1.

A structure and operations of the encryptor 10 are described next. FIG. 4 is a block diagram that illustrates a functional structure of the encryptor 10. FIG. 5 is a flow chart that illustrates the operations of the encryptor 10.

As illustrated in FIG. 4, the encryptor 10 includes an input acceptance unit 11, a detection unit 12, a region splitting unit 13, a number-of-splits setting unit 14, the display unit 15, a split data generation unit 16, a split data transmission unit 17, and a storage unit 18. FIG. 4 further illustrates a plurality of cloud servers, which are the cloud servers 20a and 20b through a cloud server 20n, and the cloud server 20a includes a split data reception unit 21 and a split data retaining unit 22. The cloud servers 20b to 20n each have a structure similar to the structure of the cloud server 20a. The number of the cloud servers 20b to 20n is not particularly limited.

The encryptor 10 is a device that splits the encryption target data 30 in accordance with the secret sharing scheme. Specifically, the encryptor 10 is an information communication terminal, such as a personal computer, a smartphone, a tablet terminal, or a server.

The display unit 15 causes the encryption target data 30 to be displayed on the display screen 40 as the image 50 (S11 in FIG. 5). Specifically, the display unit 15 is a display panel (a display device), such as a liquid crystal panel or an organic electroluminescent (EL) panel. The encryption target data 30 is stored in the storage unit 18 for example.

The display unit 15 may be provided as a separate display device outside the encryptor 10. In such a case, the encryptor 10 includes a display control unit instead of the display unit 15 and the display control unit outputs display information for causing the encryption target data 30 to be displayed on the display screen 40 of the display device provided outside as an image to the display device.

The input acceptance unit 11 is an example of the first acceptance unit and accepts designation of the target region 61, which is an at least partial region of the displayed image 50 (S12 in FIG. 5). Also, the input acceptance unit 11 is an example of the second acceptance unit and accepts designation regarding the splitting of the designated target region 61 (S13 in FIG. 5). The input acceptance unit 11 may include a function of the detection unit 12.

Although in Embodiment 1, the input acceptance unit 11 accepts the designation of the number of splits as the above-described designation regarding the splitting, the input acceptance unit 11 may accept the designation of a threshold instead of or in addition to the number of splits. That is, the input acceptance unit 11 accepts at least one of the designation of the number of splits and the designation of a threshold. The threshold is a value that indicates the number of pieces of the encryption target data 30 after the splitting, which are necessary for decoding.

Although in Embodiment 1, the input acceptance unit 11 is a touch panel that accepts input of a user onto the display screen 40 using a finger or a stylus, the input acceptance unit 11 may be any device only when the device functions as an input interface, such as a mouse or a keyboard.

The detection unit 12 detects the input of the user onto the input acceptance unit 11. The detection unit 12 is specifically a processor, a microcomputer, a dedicated circuit, or the like.

The region splitting unit 13 splits the image 50 into the target region 61 and the non-target region 62 in accordance with the designation of the target region 61 detected by the detection unit 12, and causes the display unit 15 to display the target region 61. The region splitting unit 13 is specifically a processor, a microcomputer, a dedicated circuit, or the like.

In the above-described example of FIG. 3, the display unit 15 displays the target region 61 of the image 50 in accordance with the control (a control signal) of the region splitting unit 13 by surrounding the target region 61 with a line and changing the hue of the target region 61. The target region 61 may be displayed in any manner only when the manner enables the user who visually recognizes the display unit 15 to sense the target region 61.

The number-of-splits setting unit 14 causes the display unit 15 to display the number of splits in accordance with the number of splits detected by the detection unit 12. The region splitting unit 13 is specifically a processor, a microcomputer, a dedicated circuit, or the like.

The number-of-splits setting unit 14 may cause the number of splits to be displayed in characters in the above-described example of FIG. 3 or may cause a splitting line to be displayed as described below. The number of splits may be displayed in any manner only when the manner enables the user who visually recognizes the display unit 15 to sense the number of splits.

The split data generation unit 16 splits the data that is included in the encryption target data 30 and corresponds to the designated target region 61 in accordance with the user's designation regarding the splitting under the secret sharing scheme (S14 in FIG. 5). The split data generation unit 16 splits the data corresponding to the non-target region 62, which is the region other than the designated target region 61, by a predetermined method. The split data generation unit 16 is an example of the splitting unit and is specifically a processor, a microcomputer, a dedicated circuit, or the like. The information on the position of the target region 61, the number of splits, and the like are output from the detection unit 12 to the split data generation unit 16 through the number-of-splits setting unit 14.

Further, the split data generation unit 16 generates correlation information that indicates the correlation between the encryption target data 30 corresponding to the target region 61 and the encryption target data 30 corresponding to the non-target region 62, and causes the generated correlation information to be stored in the storage unit 18. The correlation information is used in decoding the encryption target data 30, and is for example, table format information or may be information in another format.

The split data transmission unit 17 transmits the encryption target data 30 after the splitting, which is hereinafter also referred to as the split data, to the plurality of cloud servers 20a to 20n (S15 in FIG. 5). As a result, the split encryption target data 30 are stored through distribution. Although the split data transmission unit 17 is specifically a general-purpose communication module (communication circuit), the split data transmission unit 17 is not particularly limited. The split data transmission unit 17 may perform communication using any wire or wireless communication scheme (communication standard).

The storage unit 18 stores the encryption target data 30, the above-described correlation information, and the like. Specifically, the storage unit 18 is a storage device, such as a hard disk drive (HDD) or semiconductor memory. The storage unit 18 may be provided as a separate storage device outside the encryptor 10.

The cloud servers 20a to 20n are examples of the server device and retain the split data.

The split data reception unit 21 receives the split data from the split data transmission unit 17. The split data reception unit 21 may perform communication using any wire or wireless communication scheme (communication standard).

The split data retaining unit 22 is a storage device in which the split data received by the split data reception unit 21 is stored. The split data retaining unit 22 is specifically a storage device, such as an HDD or semiconductor memory.

[Details of Encryption Method]

Figure 6:
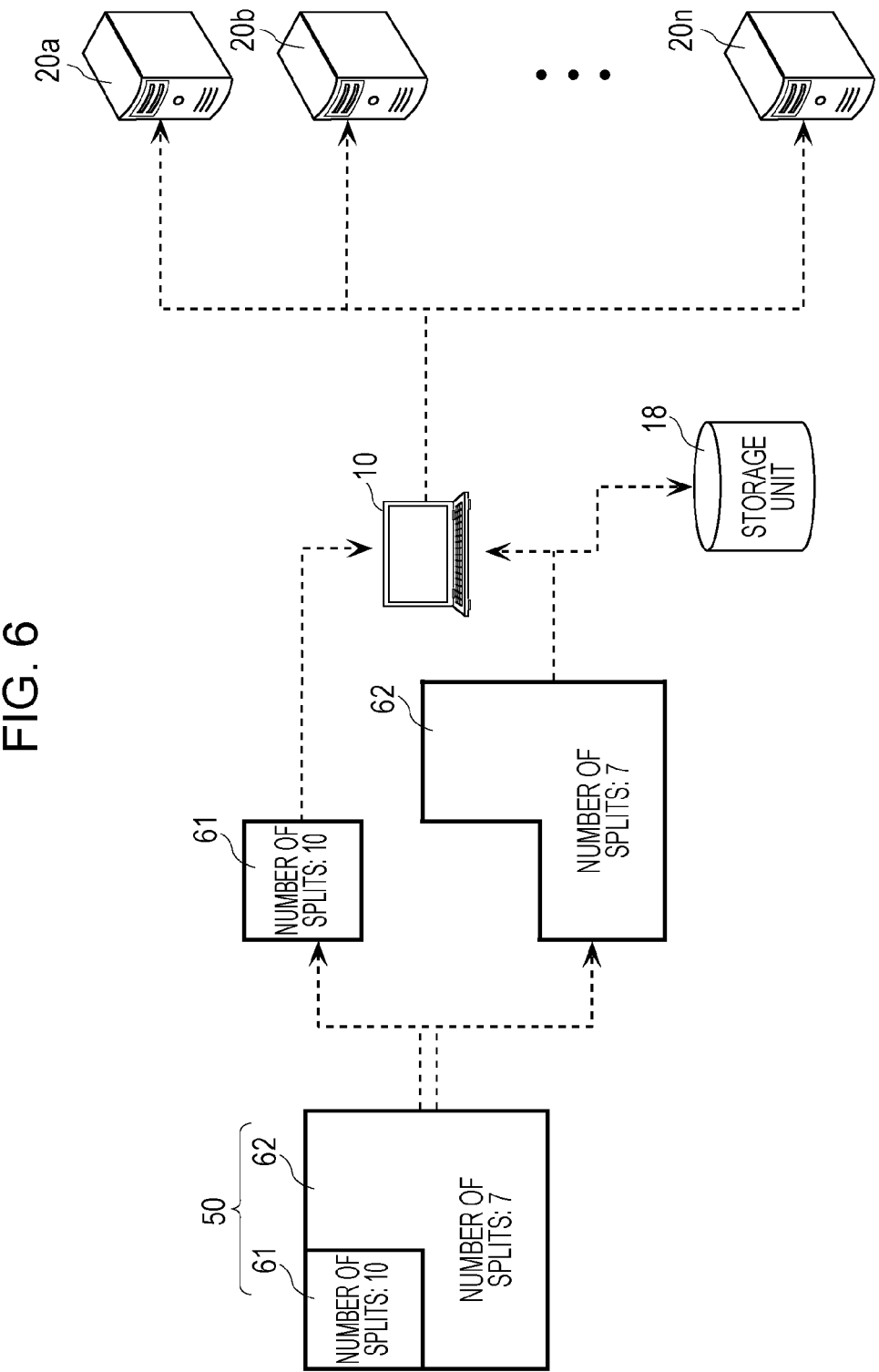
FIG. 6 is a diagram for explaining splitting of encryption target data.

Described below are details of the encryption method that the encryptor 10 performs, that is, the splitting of the encryption target data 30. FIG. 6 is a diagram for explaining the splitting of the encryption target data 30.

As described above, in the encryptor 10, the designation of the target region 61 and the designation of the number of splits of the target region 61 are performed on the encryption target data 30 displayed as the image 50. In the example of FIG. 6, the number of splits of the target region 61 is designated as ten. Accordingly, the split data generation unit 16 of the encryptor 10 splits data (pixel data) that is included in the encryption target data 30 and corresponds to the target region 61 into ten pieces of split data, and distributes and transmits the ten pieces of split data to the plurality of cloud servers 20a to 20n.

The non-target region 62 that is included in the image 50 and is not designated by the user is split by a predetermined method using the secret sharing scheme. In the example of FIG. 6, the split data generation unit 16 of the encryptor 10 splits data (pixel data) corresponding to the non-target region 62 into seven pieces of split data, and distributes and transmits the seven pieces of split data to the plurality of cloud servers 20a to 20n.

Constitution information indicating that the ten pieces of split data constitute the encryption target data 30 corresponding to the target region 61 is managed by the cloud servers 20a to 20n. Similarly, constitution information indicating that the seven pieces of split data constitute the encryption target data 30 corresponding to the non-target region 62 is managed by the plurality of cloud servers 20a to 20n.

The correlation information indicating the correlation between the encryption target data 30 corresponding to the target region 61, which is the data before the splitting of the ten pieces of split data, and the encryption target data 30 corresponding to the non-target region 62, which is the data before the splitting of the seven pieces of split data, is stored in the storage unit 18. In decoding the encryption target data 30, such correlation information and the above-described constitution information are used to collect the split data.

In the description of FIG. 6 above, the encryption target data 30 corresponding to the non-target region 62 is split by the predetermined method.

However, similar to the encryption target data 30 corresponding to the target region 61, the encryption target data 30 corresponding to the non-target region 62 may be split in accordance with the user's designation regarding the splitting under a secret sharing scheme. The encryption target data 30 corresponding to the non-target region 62 may remain unsplit.

[Designation of Target Region and Designation of Number of Splits]

A method of designating the target region 61 and a method of designating the number of splits are described below.

The designation of the target region 61 is performed by surrounding a desired region through, for example, a dragging operation on the display screen 40 of the display unit 15, which is an operation of putting a finger onto the display screen 40 and moving the finger without taking the put finger off the display screen 40. The designation method of the target region 61 is not limited to the above-described method and the target region 61 may be designated in any manner.

Figure 7:
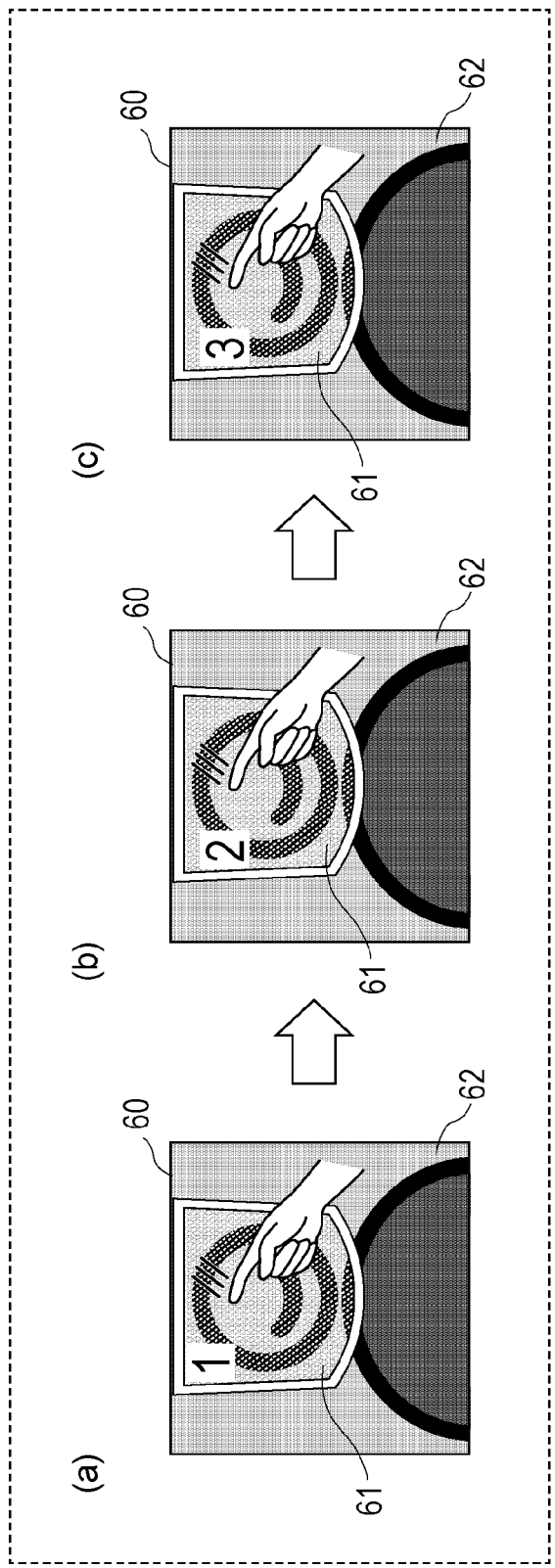
FIG. 7 is an illustration of an example in which the number of splits is designated in accordance with the number of taps on a display screen.

Various methods are conceivable for the designation of the number of splits. The number of splits is designated in accordance with, for example, the number of taps on the display screen 40 of the display unit 15. FIG. 7 is an illustration of an example in which the number of splits is designated in accordance with the number of taps on the display screen 40. In FIG. 7, only the photograph region 60 of the image 50 is illustrated.

When the number of splits is designated in accordance with the number of taps on the display screen 40, the input acceptance unit 11 accepts the number of taps on the display screen 40 as the number of splits. As illustrated in FIG. 7(*a*)-(*c*), on the basis of the control of the number-of-splits setting unit 14, the display unit 15 causes the number of taps to be displayed on the display screen 40 as the number of splits. Although the position on the display screen 40 at which the tap is performed is not particularly limited, for example, only a tap in the target region 61 may be detected as a valid tap.

Thus, a user can easily designate the number of splits of specific part included in the encryption target data 30 through the tapping operation on the display screen 40.

The number of splits may be designated according to the duration of the long push against the display screen 40. In this case, the input acceptance unit 11 accepts a count value obtained by counting up or counting down for the duration of the long push (touch) against the display screen 40 as the number of splits. After that, the display unit 15 causes the count value to be displayed on the display screen 40 as the number of splits on the basis of the control of the number-of-splits setting unit 14. Although the position on the display screen 40 at which the long push is performed is not particularly limited, for example, only a long push in the target region 61 may be detected as a valid long push.

Thus, a user can easily designate the number of splits of specific part included in the encryption target data 30 through the long push operation on the display screen 40.

Figure 8:
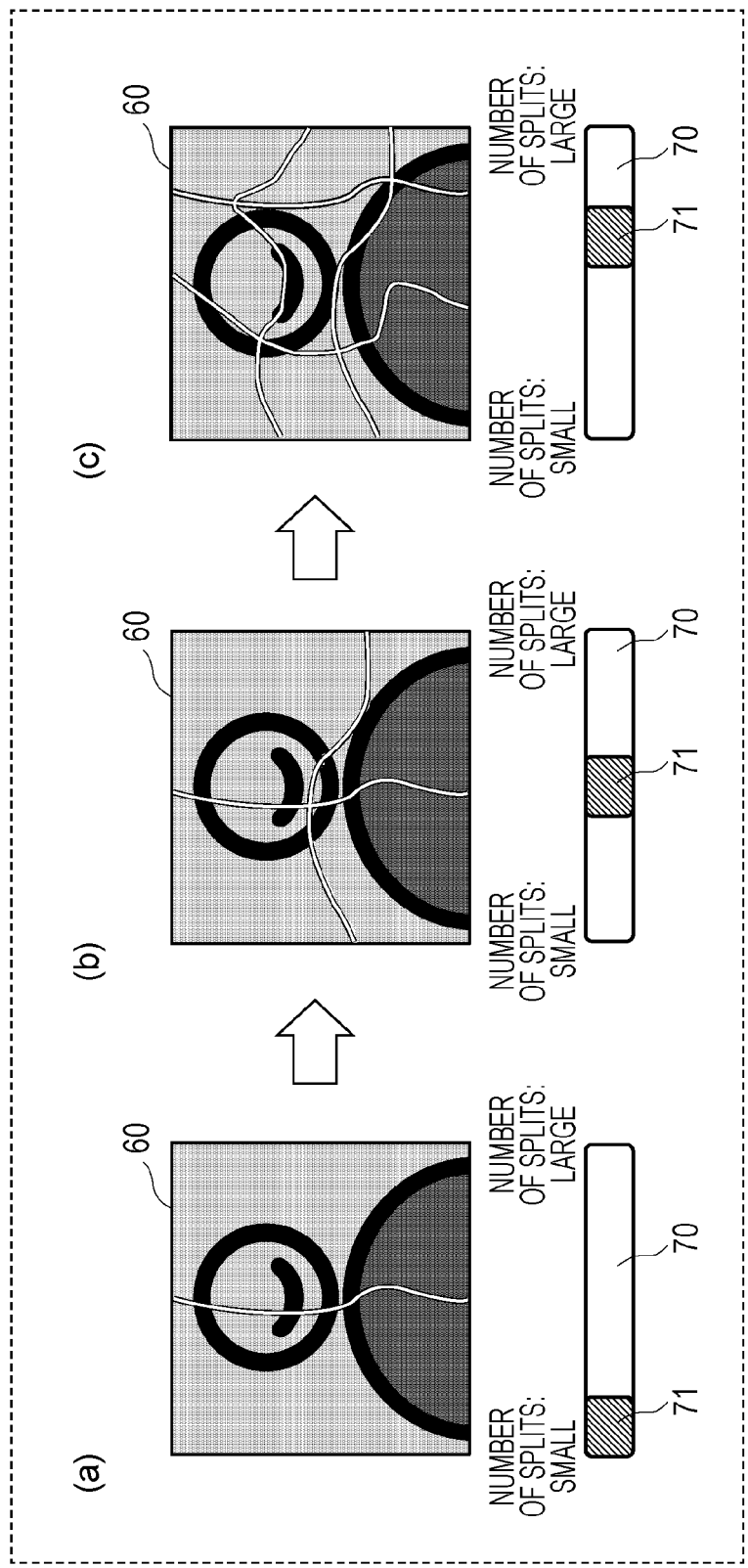
FIG. 8 is an illustration of an example in which the number of splits is designated in accordance with the position of a knob of a graphical user interface (GUI) of a slider.

The number of splits may be designated according to the position of a knob 71 of a GUI of a slider 70 displayed on the display screen 40. FIG. 8 is an illustration of an example in which the number of splits is designated according to the position of the knob 71 of the slider 70 of the GUI. In FIG. 8, only the photograph region 60 of the image 50 is illustrated and FIG. 8 is described below under the assumption that the entire photograph region 60 constitutes the target region.

In the example of FIG. 8, the display unit 15 causes the slider 70, which is a GUI of a slider, to be displayed on the display screen 40, and the input acceptance unit 11 accepts a value specified according to the position of the knob 71 of the slider 70 as the number of splits. After that, the display unit 15 causes the number of splits to be displayed on the display screen 40 on the basis of the control of the number-of-splits setting unit 14. The position on the display screen 40 at which the slider 70 is displayed is not particularly limited, but typically, the slider 70 is displayed near the target region, which is the photograph region 60 in FIG. 8.

The number of splits may be displayed as a numeral or, as illustrated in FIG. 8, a splitting line may be displayed. In this case, when a user changes the position of the knob 71 of the slider 70 though a dragging operation as illustrated in FIG. 8(*a*)-(*c*), the number of splits (the number of splits based on the splitting lines) increases or decreases, depending on the position of the knob 71.

Figure 9:
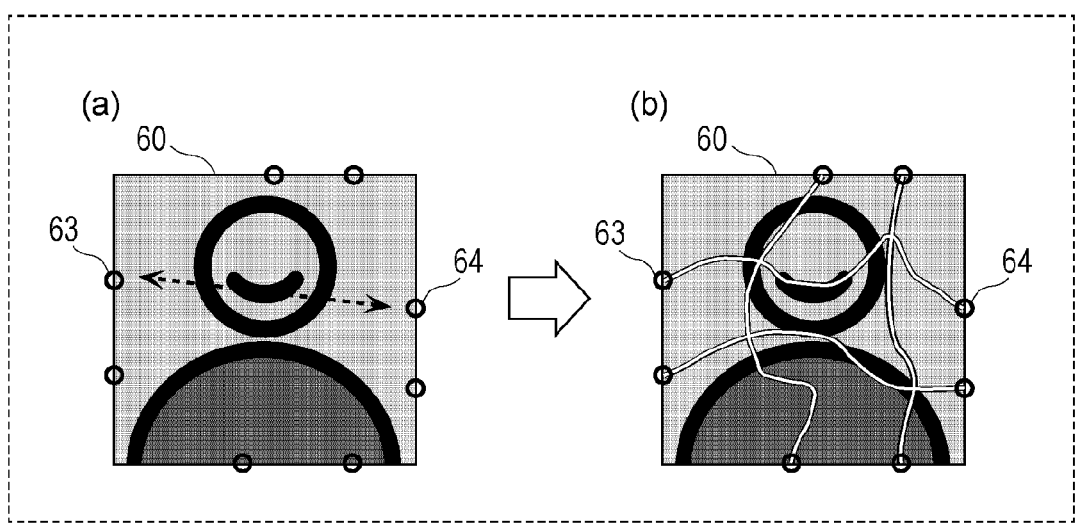
FIG. 9 is an illustration for explaining an example of a method of changing the number of splitting lines based on a splitting line in accordance with the position of the knob of the slider.

A method of changing the number of splits based on the splitting lines in accordance with the position of the knob 71 of the slider 70 is described in detail below with reference to FIG. 9. FIG. 9 is an illustration for explaining an example of the method of changing the number of splits based on the splitting lines in accordance with the position of the knob 71 of the slider 70.

In the example of FIG. 9, points of the number dependent on the position of the slider 70 are set for each side of the photograph region 60. For example, two points are set for each side as illustrated in FIG. 9(*a*). The points may be randomly positioned at this time.

After that, corresponding points are connected by a straight line or a curved line. The corresponding points mentioned here are points 63 and 64 for example. That is, in connecting the points provided on the two sides extending in the upward and downward directions, which face each other, the points having the same positional rank (in other words, the points ordered to be equivalent in the respective sequences) when counted from the upper side of each side serve as the corresponding points.

As illustrated in FIG. 9(*b*), the corresponding points are connected under the constraint that lines in the lateral direction do not cross each other and lines in the longitudinal direction do not cross each other. The corresponding points may be connected in any manner as long as this constraint is ensured.

Accordingly, a user may easily designate the number of splits of specific part included in the encryption target data 30 through a dragging operation for the knob 71 of the slider 70. When the splitting lines are displayed on the display screen 40 in this manner, a user can visually recognize the degree of the splitting.

Figure 10:
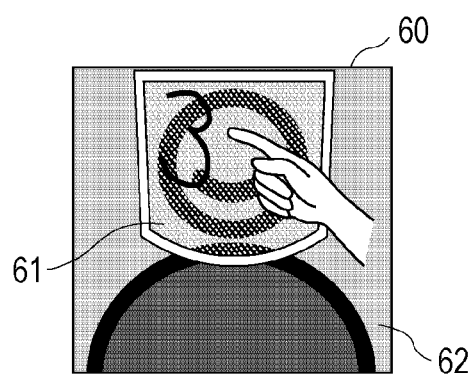
FIG. 10 is an illustration of an example in which the number of splits is designated through handwriting input of a numeral onto the display screen.

The number of splits may be designated through handwriting input of a numeral onto the display screen 40. FIG. 10 is an illustration of an example in which the number of splits is designated through handwriting input of a numeral onto the display screen 40. In FIG. 10, only the photograph region 60 of the image 50 is illustrated.

When the number of splits is designated through handwriting input of a numeral onto the display screen 40, the input acceptance unit 11 accepts the numeral provided through the handwriting input onto the display screen 40 as the number of splits. Then, as illustrated in FIG. 10, the display unit 15 causes the numeral provided through the handwriting input to be displayed on the display screen 40. Although the position (range) on the display screen 40, which allows the handwriting input to be valid, is not particularly limited, for example, only handwriting input in the target region may be regarded as valid.

Thus, a user can easily designate the number of splits of specific part included in the encryption target data 30 through the handwriting input of a numeral onto the display screen 40.

Figure 11:
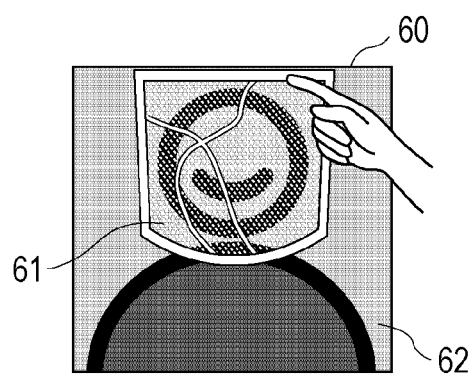
FIG. 11 is an illustration of an example in which the number of splits is designated through handwriting input of a splitting line onto the display screen.

The number of splits may be designated through the handwriting input of splitting lines onto the display screen 40. FIG. 11 is an illustration of an example in which the number of splits is designated through handwriting input of a splitting line onto the display screen 40. In FIG. 11, only the photograph region 60 of the image 50 is illustrated.

When the number of splits is designated through the handwriting input of a splitting line onto the display screen 40, the input acceptance unit 11 accepts the number of regions split by the splitting line provided through the handwriting input onto the target region of the display screen 40, which is the photograph region 60 in FIG. 11, as the number of splits. Then, as illustrated in FIG. 11, the display unit 15 causes the splitting lines provided through the handwriting input to be displayed on the display screen 40.

Thus, a user can easily designate the number of splits of specific part included in the encryption target data 30 through the handwriting input of a splitting line onto the display screen 40.

When a user inputs a splitting line by handwriting, the number of splits, and the shapes and sizes of the regions after the splitting are set freely, and accordingly, it may be difficult to generate split data that corresponds to each region of the image 50 split through the handwriting input. In such a case, when the encryption target data 30 corresponding to the target region is split into pieces of the number of splits specified by the splitting lines, it is allowed that the split data does not completely correspond to each region of the image split through the handwriting input.

The method of designating the target region 61 and the method of designating the number of splits are described above. As described above, the input acceptance unit 11 may accept the designation of a threshold instead of or in addition to the number of splits, and also in the case in which a threshold is accepted, a structure similar to the structure employed in the case in which the number of splits is accepted. In accepting a threshold, normally, neither the designation of a threshold through handwriting input of a splitting line nor the display of a splitting line by the display unit 15 is performed.

[Recapitulation]

As described above, the encryptor 10 causes the encryption target data 30 to be displayed on the display screen 40 as the image 50 and accepts the designation of the target region 61, which is an at least partial region of the displayed image 50. The encryptor 10 further accepts the designation regarding the splitting of the designated target region 61 and splits the data that is included in the encryption target data 30 and corresponds to the designated target region 61 in accordance with the designation regarding the splitting under the secret sharing scheme.

Thus, a user can easily designate the number of splits of specific part included in the encryption target data 30.

[Variation]

Figure 12:
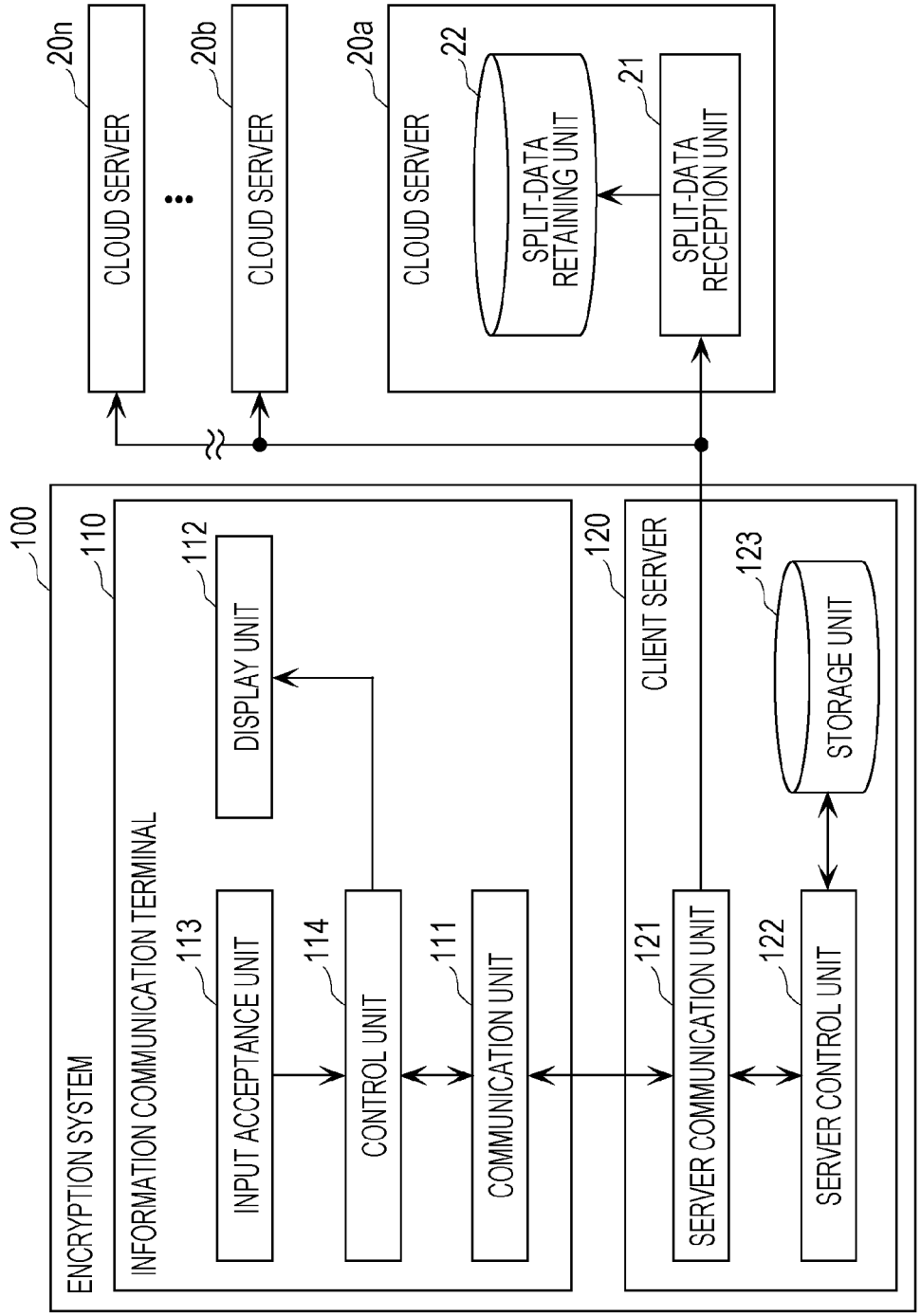
FIG. 12 is a block diagram that illustrates a functional structure of an encryption system.
Figure 13:
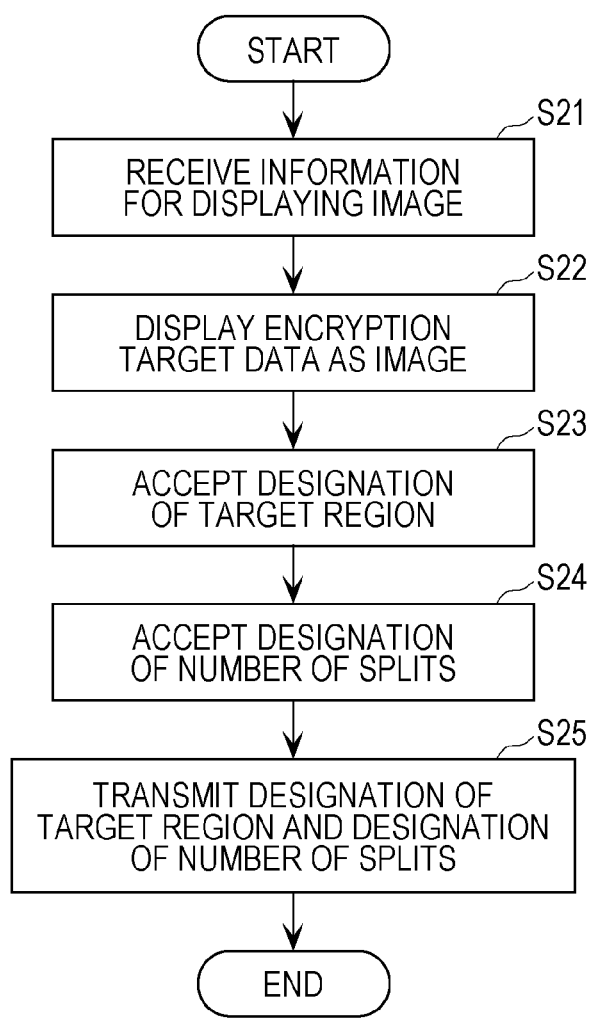
FIG. 13 is a flow chart that illustrates operations of an information communication terminal.
Figure 14:
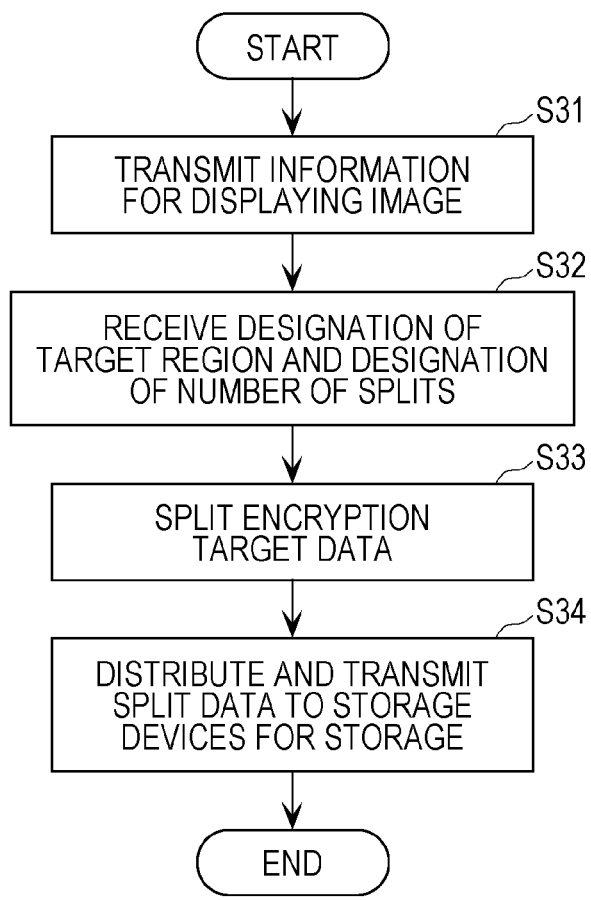
FIG. 14 is a flow chart that illustrates operations of a client server.

The present disclosure may be implemented as an encryption system that includes an information communication terminal and a client server. Described below are a structure and operations of an encryption system 100. FIG. 12 is a block diagram that illustrates a functional structure of the encryption system 100. FIG. 13 is a flow chart that illustrates operations of an information communication terminal 110. FIG. 14 is a flow chart that illustrates operations of a client server 120. Overlapping explanation on the constituent elements substantially the same as the constituent elements already described in Embodiment 1 may be omitted below.

The encryption system 100 illustrated in FIG. 12 is an encryption system using a secret sharing scheme, and includes the information communication terminal 110 and the client server 120.

The information communication terminal 110 includes a communication unit 111, a display unit 112, an input acceptance unit 113, and a control unit 114. For example, the information communication terminal 110 is a personal computer, a smartphone, or a tablet terminal.

The communication unit 111 receives display information for displaying an encryption target data 30 as an image 50 from a server communication unit 121 of the client server 120 (S21 in FIG. 13). Further, the communication unit 111 transmits designation of a target region 61 and designation regarding splitting to the server communication unit 121 of the client server 120 (S25 in FIG. 13). The communication unit 111 is an example of the reception unit and the transmission unit and is specifically a general-purpose communication module (communication circuit) or the like.

The display unit 112 displays the image 50 based on the received display information (S22 in FIG. 13). The display unit 112 is specifically a display panel (display device), such as a liquid crystal panel or an organic EL panel. The display information is output from the server communication unit 121 to the display unit 112 through the control unit 114.

The input acceptance unit 113 accepts designation of the target region 61, which is an at least partial region of the displayed image 50 (S23 in FIG. 13). Further, the input acceptance unit 113 accepts designation regarding the splitting of the designated target region 61 (S24 in FIG. 13). The input acceptance unit 113 is an example of the first acceptance unit and the second acceptance unit, and is specifically a touch panel or the like.

The control unit 114 performs control regarding the information communication terminal 110, which includes communication control of the communication unit 111, display control of the display unit 112, and detection of input onto the input acceptance unit 113. The control unit 114 is specifically a processor, a microcomputer, a dedicated circuit, or the like.

The client server 120 is an example of the server, and includes the server communication unit 121, a server control unit 122, and a storage unit 123.

The server communication unit 121 transmits display information to the communication unit 111 of the information communication terminal 110 (S31 in FIG. 14). For example, the display information is generated by the server control unit 122 using the encryption target data 30 stored in the storage unit 123 and the display information includes information for displaying the target region 61, the number of splits, and the splitting lines on the display screen 40, which are described above.

Further, the server communication unit 121 receives the designation of the target region 61 and the designation regarding the splitting from the communication unit 111 of the information communication terminal 110 (S32 in FIG. 14). In addition, the server communication unit 121 distributes and transmits the split encryption target data 30 to a plurality of cloud servers 20a to 20n (S34 in FIG. 14). The server communication unit 121 is an example of the server transmission unit and the server reception unit, and is specifically a general-purpose communication module (communication circuit).

The server control unit 122 performs control regarding the information communication terminal 110, such as communication control of the server communication unit 121. The server control unit 122 splits the data that is included in the encryption target data 30 and corresponds to the designated target region 61 in accordance with the designation regarding the splitting under the secret sharing scheme (S33 in FIG. 14). The server control unit 122 is an example of the splitting unit and is specifically a processor, a microcomputer, a dedicated circuit, or the like.

The storage unit 123 stores the encryption target data 30, correlation information as is described above, and the like. The storage unit 123 is specifically a storage device, such as an HDD or semiconductor memory. The information communication terminal 110 may include a similar storage unit.

The above-described encryption system 100 also enables the number of splits of specific part included in the encryption target data 30 to be easily designated, similar to the encryptor 10.

The present disclosure may be implemented as an encryptor that corresponds to the client server 120 in the encryption system 100. In this case, the server communication unit 121 corresponds to the first acceptance unit and the second acceptance unit, and the server control unit 122 corresponds to the display control unit and the splitting unit.

[Other Embodiments]

Although the encryption method, the encryptor, and the encryption system according to the embodiments are described above, the present disclosure is not limited to the above-described embodiments.

Although it is explained in the above-described embodiments that the encryption target data 30 is a still image, for example, the encryption target data 30 may be a moving image, text data, or the like. The encryption target data 30 may be any data only when the data can be displayed on the display screen 40 as the image 50.

In each of the above-described embodiments, each constituent element may be configured with dedicated hardware or may be implemented by executing a software program suitable for each constituent element. Each constituent element may be implemented by a program execution unit, such as a central processing unit (CPU) or a processor, reading a software program recorded in a recording medium, such as a hard disk or semiconductor memory, and executing the software program.

The constituent elements may be circuits. Such circuits may make up a single circuit as a whole or may be separate circuits. Each of the circuits may be a general-purpose circuit or may be a dedicated circuit.

Although the encryption method, the encryptor, and the encryption system according to one or more aspects based on the embodiments are described above, the present disclosure is not limited to the embodiments. As long as the spirit of the present disclosure is not departed, an embodiment in which each kind of variations that those skilled in the art can conceive is applied to the present embodiment or an embodiment obtained by combining constituent elements according to a different embodiment may also be included in the scope of the one or more aspects.

The present disclosure is applicable to cloud computing or the like as an encryption method using a secret sharing scheme, which enables the number of splits of specific part included in data to be easily designated.

What is claimed is:

1. An encryption method using a secret sharing scheme, the encryption method comprising:
   displaying encryption target data on a display screen as an image;
   performing acceptance in which splitting designation of the displayed image is accepted; and
   splitting the encryption target data in accordance with the splitting designation under the secret sharing scheme,
   wherein the splitting designation includes one or more splitting lines, each of the one or more splitting lines corresponds to each of tracing lines by tracing on the display screen,
   wherein the splitting splits the encryption target data to two or more data according to the secret sharing scheme, each of the two or more data corresponds to each of two or more partial regions of the displayed image that are generated by splitting the displayed image by the one or more splitting lines, and
   wherein the one or more splitting lines is displayed on the display screen with the displayed image.

2. An encryption method using a secret sharing scheme, the secret sharing scheme comprising:
   displaying encryption target data on a display screen as an image;
   performing acceptance in which splitting designation of the displayed image is accepted; and
   splitting the encryption target data in accordance with the splitting designation under the secret sharing scheme,
   wherein the splitting designation includes one of (i) a number of splits and (ii) a threshold indicating a number of splits the encryption target data needed in decryption,
   wherein in the acceptance, a count value obtained by counting up for a duration of a long push against the display screen is accepted as the number of splits or the threshold, and
   wherein in the displaying the encryption target data, the count value is further displayed on the display screen.

3. The encryption method according to claim 1,
   wherein each of the one or more splitting lines is identical to each of the one or more tracing lines that is traced by fingertip of user on the display screen.

4. The encryption method according to claim 1,
   wherein the splitting designation includes a number of the partial image, and
   wherein when the splitting cannot split the encryption target data to the two or more data according to the secret sharing scheme by using the one or more splitting lines, the splitting further splits the encryption target data to another two or more data according to the secret sharing scheme, one of the another two or more data corresponds to another partial region of the displayed image that is different from the two or more partial regions.

5. A non-transitory recording medium storing thereon a computer program, which when executed by a processor, causes the processor to perform operations including:
   displaying encryption target data on a display screen as an image;
   performing acceptance in which splitting designation of the displayed image is accepted; and
   splitting the encryption target data in accordance with the splitting designation under a secret sharing scheme,
   wherein the splitting designation includes one or more splitting lines, each of the one or more splitting lines corresponds to each of tracing lines by tracing on the display screen,
   wherein the splitting splits the encryption target data to two or more data according to the secret sharing scheme, each of the two or more data corresponds to each of two or more partial regions of the displayed image that are generated by splitting the displayed image by the one or more splitting lines, and
   wherein the one or more splitting lines are displayed on the display screen with the displayed image.

6. A non-transitory recording medium storing thereon a computer program, which when executed by a processor, causes the processor to perform operations including:
   displaying encryption target data on a display screen as an image;
   performing acceptance in which splitting designation of the displayed image is accepted; and
   splitting the encryption target data in accordance with the splitting designation under a secret sharing scheme,
   wherein the splitting designation includes one of (i) a number of splits and (ii) a threshold indicating a number of splits the encryption target data needed in decryption,
   wherein in the acceptance, a count value obtained by counting up for a duration of a long push against the display screen is accepted as the number of splits or the threshold, and
   wherein in the displaying the encryption target data, the count value is further displayed on the display screen.

* * * * *